United States Patent [19]

Hsu

[11] Patent Number: 5,553,386
[45] Date of Patent: Sep. 10, 1996

[54] FOLDABLE SAW

[76] Inventor: An-Sun Hsu, No. 99, Yu-Ai St., Tainan, Taiwan

[21] Appl. No.: 559,739

[22] Filed: Nov. 15, 1995

[51] Int. Cl.⁶ .................................................. B26B 3/06
[52] U.S. Cl. ............................... 30/161; 30/159; 30/160
[58] Field of Search ............................ 30/155, 158, 159, 30/160, 161

[56] References Cited

U.S. PATENT DOCUMENTS

| | | | |
|---|---|---|---|
| 4,660,284 | 4/1987 | Decarolis | 30/157 |
| 4,926,554 | 5/1990 | Martin | 30/161 |
| 4,979,301 | 12/1990 | Walker | 30/161 |
| 5,331,741 | 7/1994 | Taylor, Jr. | 30/158 |

FOREIGN PATENT DOCUMENTS 740133  11/1955  United Kingdom ...................... 30/161

*Primary Examiner*—Hwei-Siu Payer
*Attorney, Agent, or Firm*—Harness, Dickey & Pierce, P.L.C.

[57] ABSTRACT

A foldable saw includes an elongated handle member having opposite side walls which confine a slit therebetween and a top wall which bridges the side walls. A saw blade is formed as an elongated flat plate with a teethed edge, and has a rounded end portion mounted pivotally on the handle member such that the saw blade is pivotable between folded and unfolded positions. A locking unit is mounted on the handle member and is operable so as to engage releasably the rounded end portion of the saw blade to lock the saw blade in a selected one of the folded and unfolded positions. The saw blade has an indented section located between the rounded end portion and the teethed edge. The top wall of the handle member is formed with a through hole which extends to the slit and which is aligned with the indented section of the saw blade when the saw blade is in the folded position. The through hole has a release spring disposed therein, and further has an internally threaded upper section which engages an externally threaded plug that abuts against the release spring. The release spring is compressed by the saw blade when the saw blade is locked by the locking unit in the folded position, and expands to cause a tip of the saw blade to project out of the slit of the handle member when the locking unit is operated to unlock the saw blade from the folded position.

2 Claims, 6 Drawing Sheets

5,553,386

FOLDABLE SAW

BACKGROUND OF THE INVENTION

1. Field of the Invention

The invention relates to a saw, more particularly to a foldable saw which requires the use of only one hand when folding or unfolding the same.

2. Description of the Related Art

Referring to FIG. 1, a conventional foldable saw is shown to comprise an elongated handle member 1, a saw blade 2, a pivot shaft 3 and a locking unit 4. The handle member 1 has opposite side walls that confine a longitudinal slit 10 therebetween. The saw blade 2 is formed as an elongated flat plate with a teethed edge 20. The saw blade 2 further has a rounded end portion 21 that is provided with a pivot hole 210 and a periphery formed with diametrically opposite first and second locking notches 211, 212. The saw blade 2 is receivable in the slit 10 of the handle member 1. The pivot shaft 3 extends through the pivot hole 210 of the saw blade 2 and engages a nut 31 to connect pivotally the saw blade 2 to the handle member 1. The locking unit 4 includes a knob which has a head portion 41 and a shaft portion 40. The shaft portion 40 has an intermediate section formed with a notch 42 and a tapered segment 43 adjacent to the notch 42, and further has a distal section formed with an annular locking groove 44. The shaft portion 40 extends through the handle member 1 and is disposed adjacent to the rounded end portion 21 of the saw blade 2. A locking spring 45 is sleeved on the shaft portion 40 and biases the locking unit 4 away from the handle member 1. A C-shaped locking ring 441 engages the locking groove 44 on the shaft portion 40 to prevent removal of the locking unit 4 from the handle member 1.

Referring to FIGS. 2 and 3, when the saw blade 2 is in a folded position, i.e. the saw blade 2 is concealed within the slit 10 of the handle member 1, the tapered segment 43 of the shaft portion 40 of the locking unit 4 engages the first locking notch 211 on the saw blade 2, thereby retaining the saw blade 2 in the folded position. When it is desired to unfold the saw blade 2, the head portion 41 of the locking unit 4 is pressed, thereby causing the tapered segment 43 of the shaft portion 40 to disengage the first locking notch 211 and cause alignment between the notch 42 on the shaft portion 40 and the first locking notch 211. At this stage, the saw blade 2 is not restricted by the locking unit 4 from rotation and can be drawn out from the slit 10 of the handle member 1. When the saw blade 2 is in an unfolded position, i.e. the saw blade 2 is extended from the handle member 1, the notch 42 on the shaft portion 40 is aligned with the second locking notch 212 on the saw blade 2. Thus, once the locking unit 4 is released from the pressed state, the locking spring 45 expands to enable the tapered segment 43 of the shaft portion 40 to engage the second locking notch 212, thereby retaining the saw blade 2 in the unfolded position. The saw can be used to cut a workpiece at this time.

Note that when the saw blade 2 is moved from the folded position to the unfolded position or vice versa, one hand of the user presses the locking unit 4, while the other hand of the user pinches the saw blade 2 so as to move the latter to the desired position. Thus, folding or unfolding of the saw inconveniences the user especially when one of his hands grasps a workpiece or a railing.

SUMMARY OF THE INVENTION

Therefore, the object of the present invention is to provide a foldable saw which requires the use of only one hand when folding or unfolding the same.

Accordingly, the foldable saw of the present invention includes an elongated handle member having opposite side walls and a top wall which bridges the side walls. The side walls confine a longitudinal slit therebetween. A saw blade is formed as an elongated flat plate with a teethed edge, and has a tip and a rounded end portion which is opposite to the tip and which is mounted pivotally on the handle member such that the saw blade is pivotable between a folded position, wherein the saw blade is concealed within the slit of the handle member, and an unfolded position, wherein the saw blade is extended from the handle member. A locking unit is mounted on the handle member and is operable so as to engage releasably the rounded end portion of the saw blade to lock the saw blade in a selected one of the folded and unfolded positions. The saw blade has an indented section located between the rounded end portion and the teethed edge. The top wall of the handle member is formed with a through hole which extends to the slit and which is aligned with the indented section of the saw blade when the saw blade is in the folded position. The through hole has a release spring disposed therein, and further has an internally threaded upper section which engages an externally threaded plug that abuts against one end of the release spring. The release spring is compressed by the saw blade when the saw blade is locked by the locking unit in the folded position. The release spring expands to cause the tip of the saw blade to project out of the slit of the handle member when the locking unit is operated to unlock the saw blade from the folded position. The rounded end portion of the saw blade is sized so as to abut against the release spring when the saw blade is in the unfolded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
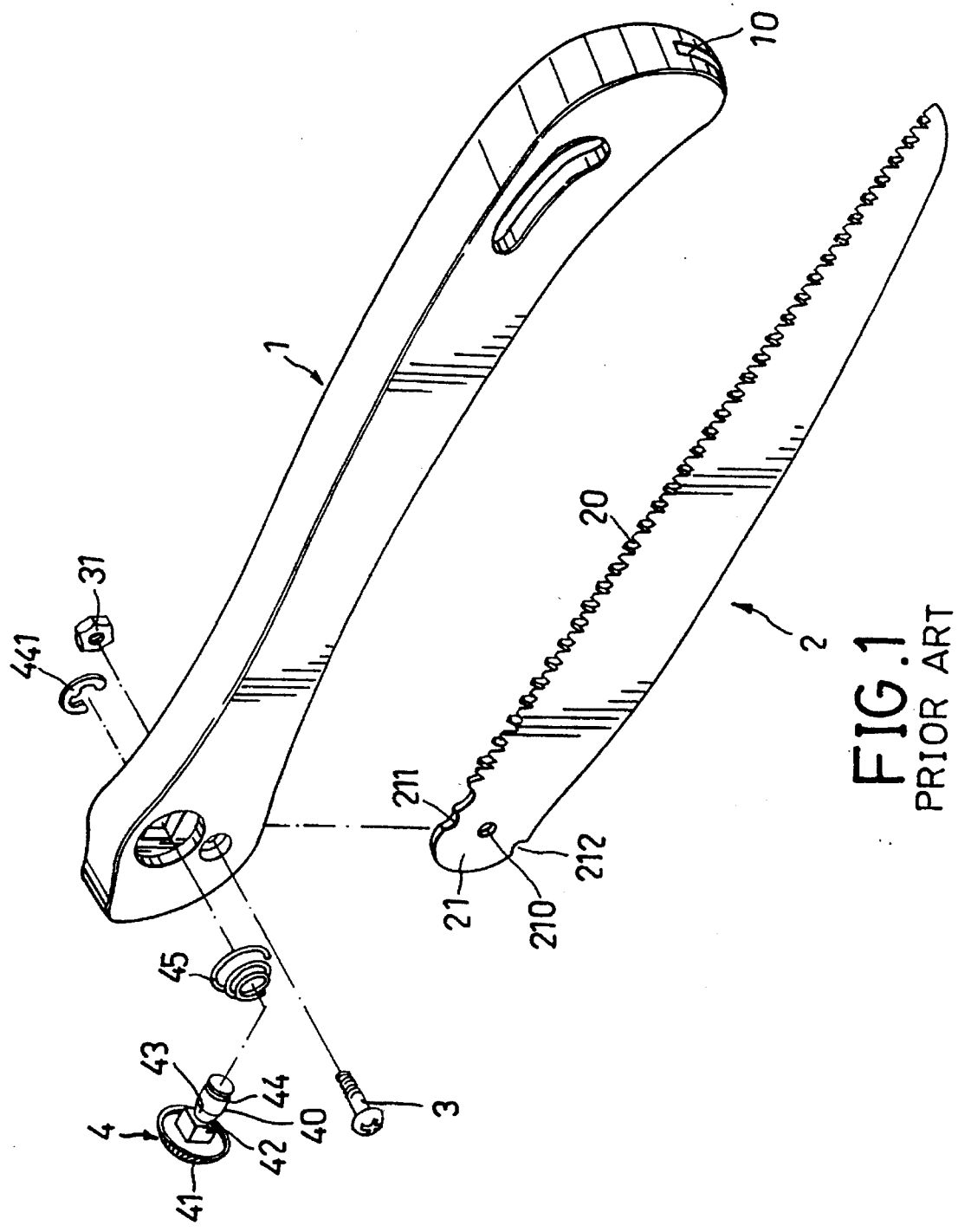
FIG. 1 is an exploded perspective view of a conventional foldable saw.
Figure 2:
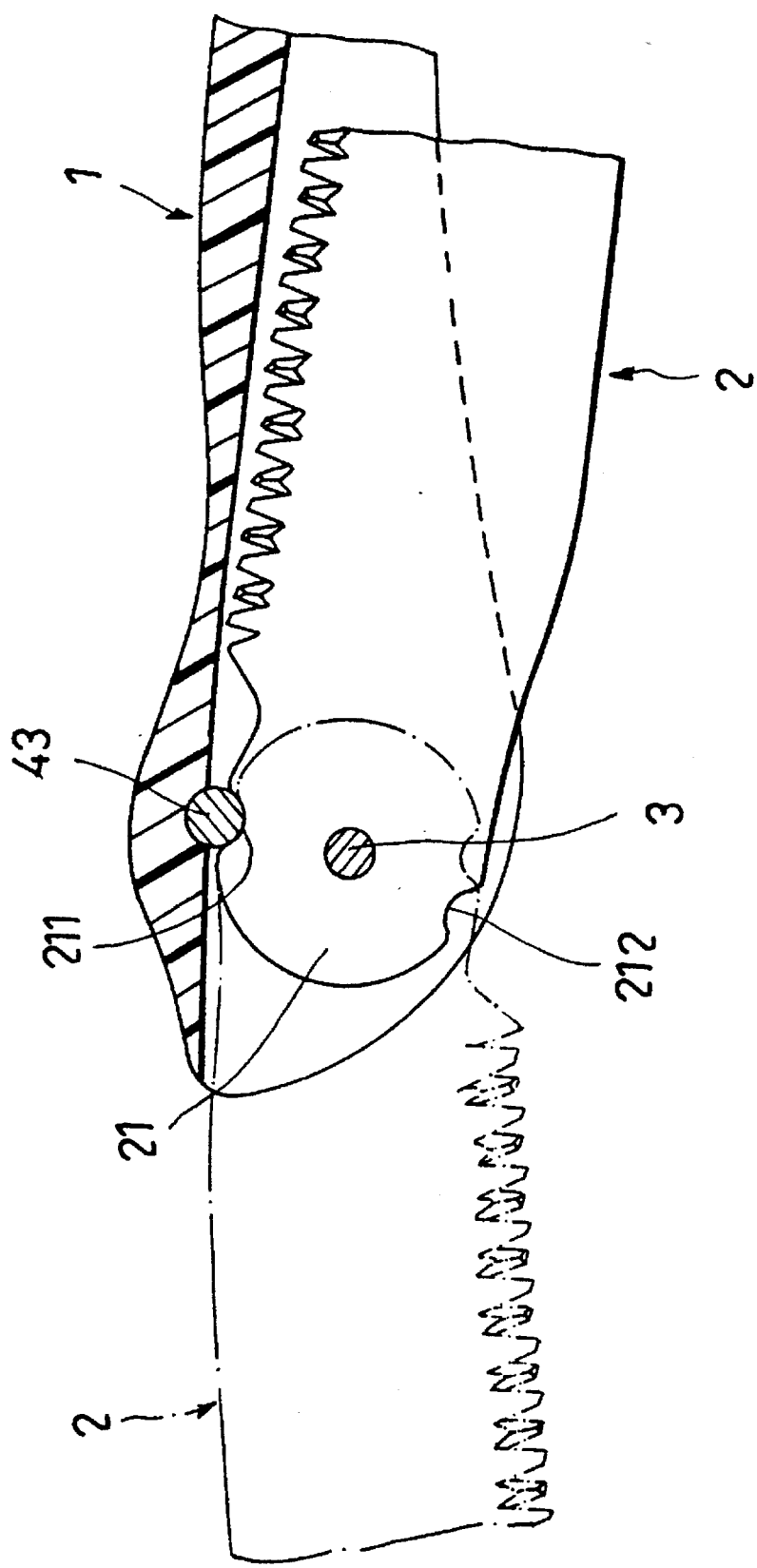
FIG. 2 is a fragmentary sectional view illustrating how the conventional foldable saw is unfolded.
Figure 3:
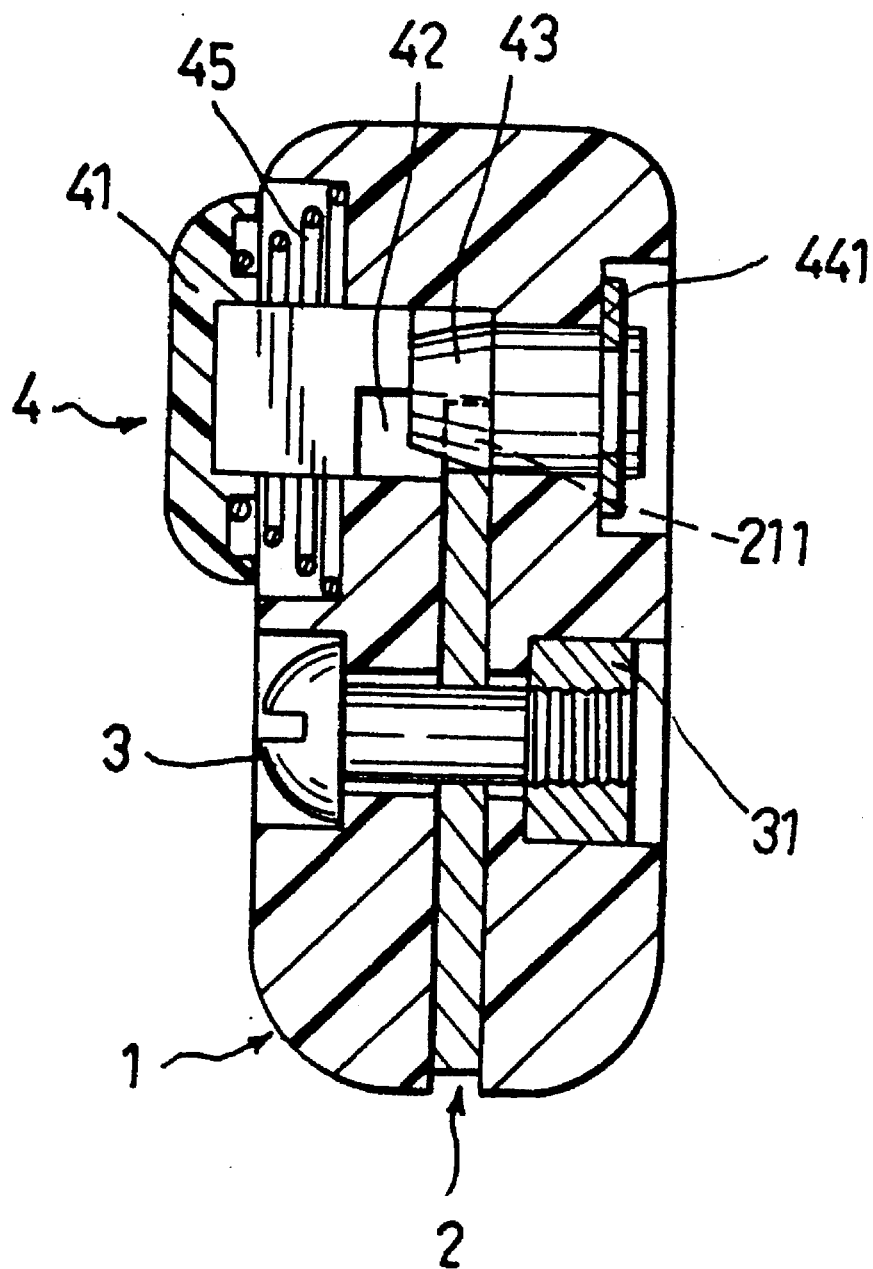
FIG. 3 is a sectional view which illustrates operation of a locking unit of the conventional foldable saw.
Figure 4:
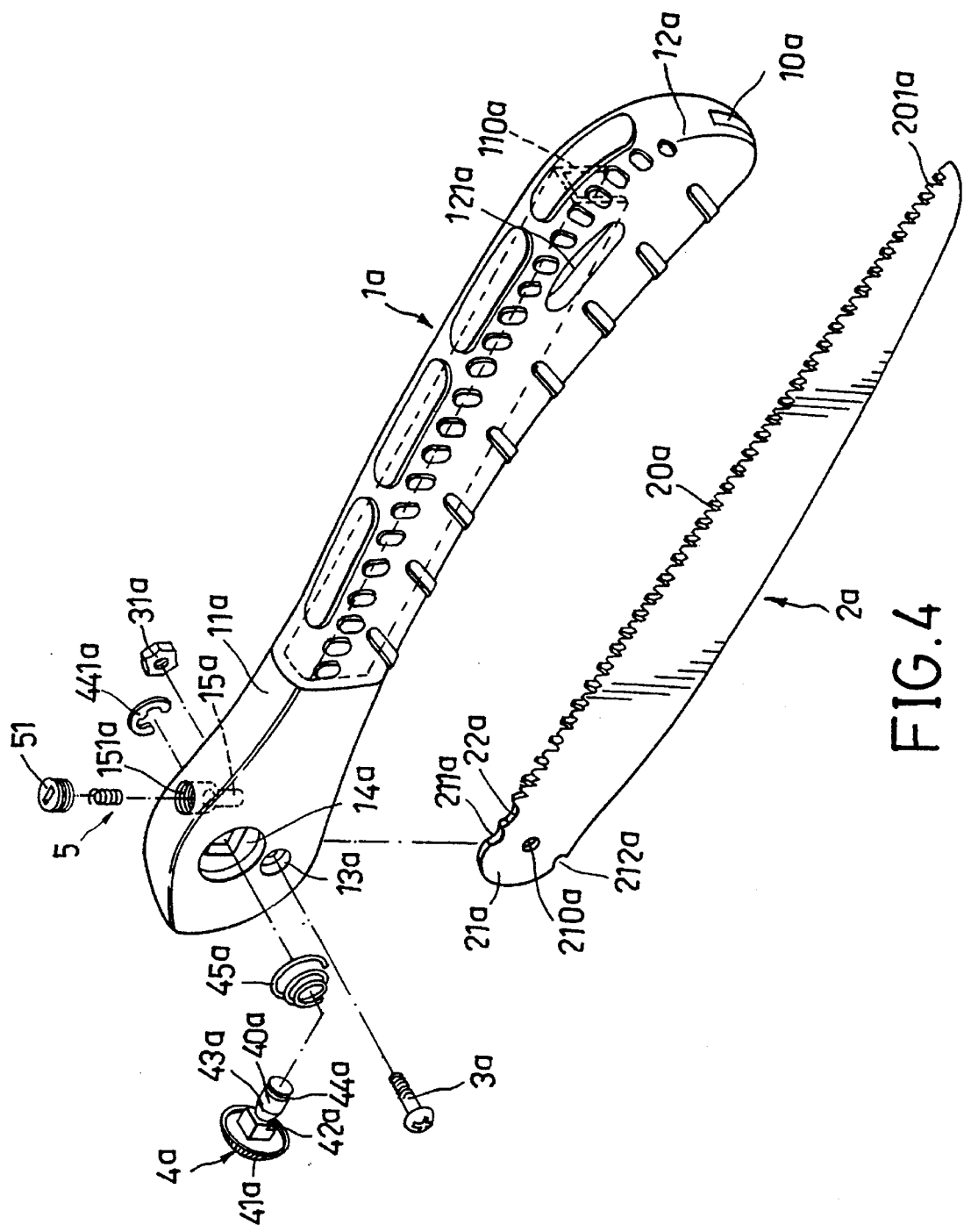
FIG. 4 is an exploded perspective view of the preferred embodiment of a foldable saw according to the present invention.

Referring to FIG. 4, the preferred embodiment of a foldable saw according to the present invention is shown to comprise an elongated handle member 1a, a saw blade 2a, a pivot shaft 3a, a locking unit 4a and a release spring 5.

The handle member 1a has opposite side walls and a top wall which bridges the side walls. The side walls confine a longitudinal slit 10a therebetween. The widths of the side walls thin gradually toward the central sections thereof. In this embodiment, the handle member 1a has a front portion 11a cast from a high strength material, such as aluminum alloy. An iron frame 110a, which has an inverted U-shaped cross section, is embedded in the front portion 11a at one end thereof. The handle member 1a further has a rear portion 12a which is made of an elastic and tenacious rubber material and which has the remaining portion of the iron frame 110a embedded therein. The outer surface of the rear portion 12a is embossed to facilitate handling by the user. The rear portion 12a is formed with elongated slots 121a (only one is shown) at a distal section thereof for aesthetic purposes. The front portion 11a is formed with a pivot hole 13a and a locking hole 14a above the pivot hole 13a. The pivot hole 13a and the locking hole 14a extend through the side walls of the handle member 1a.

The saw blade 2a is formed as an elongated flat plate with a teethed edge 20a and has a pointed tip 201a and a rounded end portion 21a that is opposite to the pointed tip 201a and that is provided with a pivot hole 210a. The saw blade 2a is received in the slit 10a of the handle member 1a such that the pivot hole 210a is aligned with the pivot hole 13a of the handle member 1a. The rounded end portion 21a has a periphery formed with diametrically opposite first and second locking notches 211a, 212a. The first locking notch 211a is adjacent to the locking hole 14a of the handle member 1a when the saw blade 2a is in a folded position, i.e. the saw blade 2a is concealed within the slit 10a of the handle member 1a. The saw blade 2a further has an indented section 22a located between the rounded end portion 21a and the teethed edge 20a.

The pivot shaft 3a, such as a bolt, extends through the pivot holes 13a, 210a and engages a nut 31a to connect pivotally the saw blade 2a to the handle member 1a. The locking unit 4a includes a knob which has a head portion 41a and a shaft portion 40a. The shaft portion 40a has an intermediate section formed with a notch 42a and a tapered segment 43a adjacent to the notch 42a, and further has a distal section formed with an annular locking groove 44a. The shaft portion 40a extends through the locking hole 14a of the handle member 1a such that the tapered segment 43a engages the first locking notch 211a on the saw blade 2a when the saw blade 2a is in the folded position and such that the tapered segment 43a engages the second locking notch 212a on the saw blade 2a when the saw blade 2a is in an unfolded position, i.e. the saw blade extends from the handle member 1a. A locking spring 45a is sleeved on the shaft portion 40a and biases the locking unit 4a away from the handle member 1a. A C-shaped locking ring 441a engages the locking groove 44a on the shaft portion 40a to prevent removal of the locking unit 4a from the handle member 1a.

Figure 5:
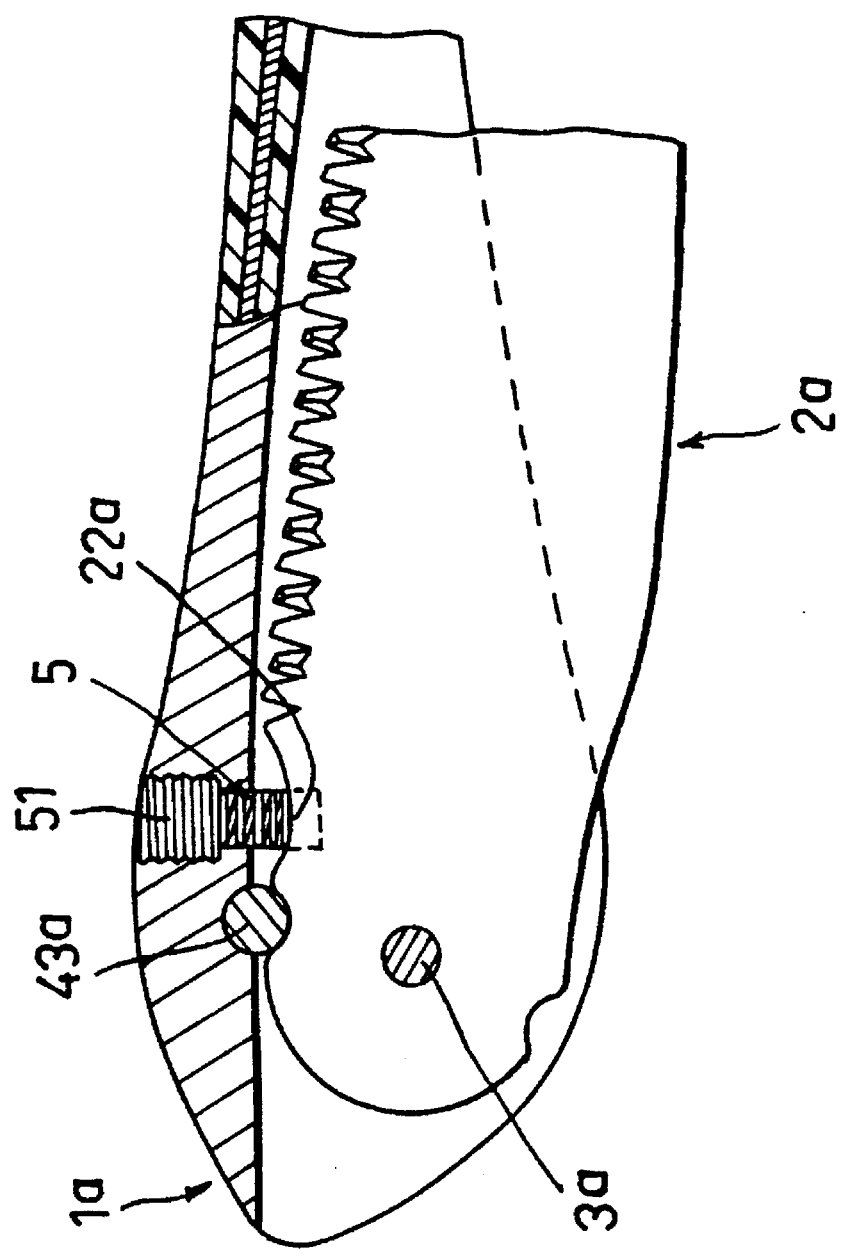
FIG. 5 is a fragmentary sectional view of the preferred embodiment when the saw blade thereof is in a folded position.
Figure 6:
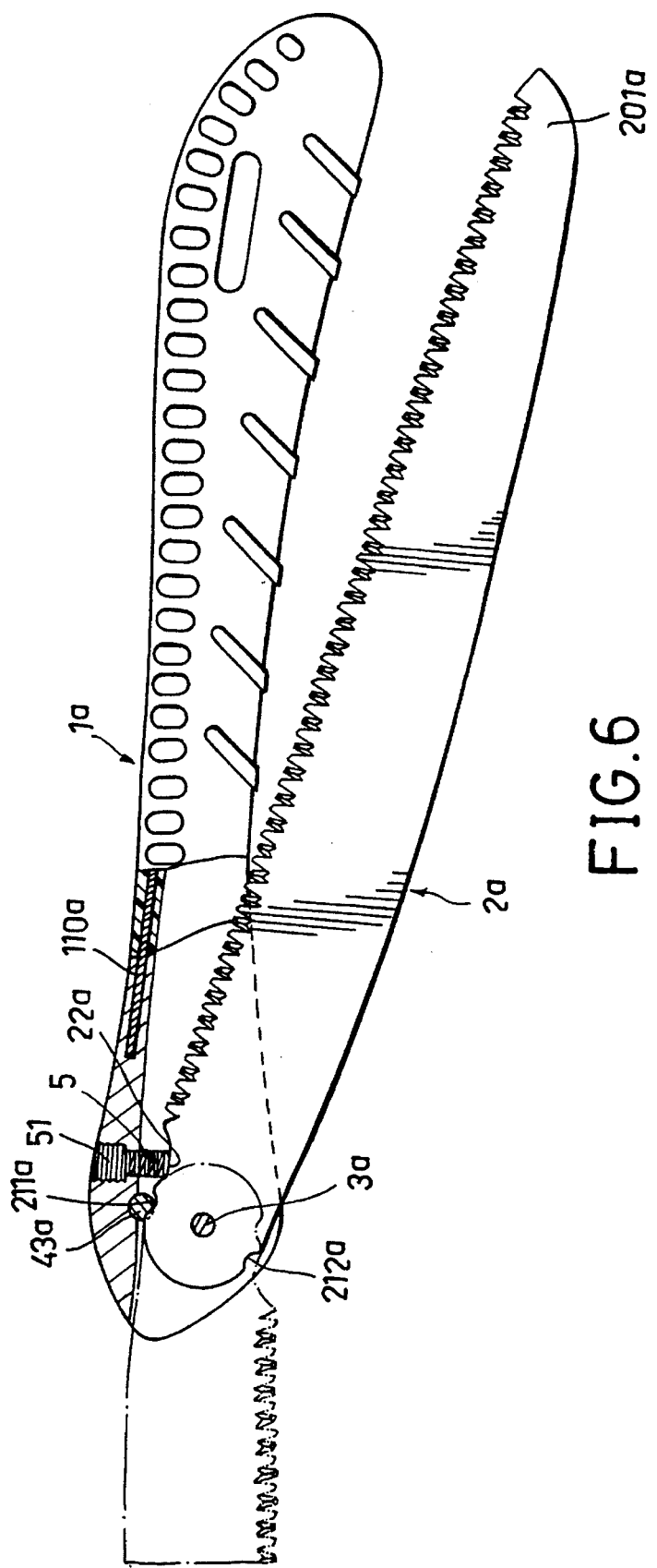
FIG. 6 is a schematic, partly sectional view which illustrates how the saw blade of the preferred embodiment is unfolded.

Referring to FIGS. 5 and 6, the top wall of the handle member 1a is formed with a through hole 15a which extends to the slit 10a and which is aligned with the indented section 22a of the saw blade 2a when the latter is in the folded position. The through hole 15a has an internally threaded wider upper section 151a. The release spring 5 is disposed in the through hole 15a and extends into the slit 10a so as to abut against the indented section 22a of the saw blade 2a when the latter is in the folded position. An externally threaded plug 51 engages the upper section 151a of the through hole 15a and abuts against one end of the release spring 5. Thus, the release spring 5 can be compressed by the saw blade 2a when the latter is in the folded position.

When it is desired to unfold the saw blade 2a, the head portion 41a of the locking unit 4a is pressed, thereby causing the tapered segment 43a of the shaft portion 40a to disengage the first locking notch 211a on the saw blade 2a and cause alignment between the notch 42a on the shaft portion 40a and the first locking notch 211a. At this stage, the saw blade 2a is not restricted by the locking unit 4a from rotation and thus, the resilient spring 5 expands to cause the pointed tip 201a of the saw blade 2a to project out of the slit 10a, as shown in FIG. 6. When the pointed tip 201a is latched on an object, such as a worktable, the handle member 1a can be pivoted so that the saw blade 2a can be extended from the handle member 1a. When the saw blade 2a is in the unfolded position, the notch 42a on the shaft portion 40a is aligned with the second locking notch 212a on the saw blade 2a. Thus, when the pressure on the locking unit 4a is removed, the locking spring 45a expands to cause the tapered segment 43a of the shaft portion 40a to engage the second locking notch 212a, thereby retaining the saw blade 2a in the unfolded position. The saw of this invention can be used to cut a workpiece at this time. Note that the rounded end portion 21a of the saw blade 2a should be sized so as to abut against the release spring 5 when the saw blade 2a is in the unfolded position to guard against removal of the release spring 5 from the handle member 1a.

When it is desired to fold the saw blade 2a, the head portion 41a of the locking unit 4a is again pressed, thereby causing the tapered segment 43a of the shaft portion 40a to disengage the second locking notch 212a on the saw blade 2a and cause alignment between the notch 42a on the shaft portion 40a and the second locking notch 212a. The dull edge of the saw blade 2a is placed against an object so that the handle member 1a can be pivoted in order to fold the saw blade 2a into the handle member 1a. The locking unit 4a is then released so that the locking spring 45a expands to cause the tapered segment 43a of the shaft portion 40a to engage the first locking notch 211a, thereby retaining the saw blade 2a in the folded position.

It has thus been shown that the foldable saw of the present invention is convenient to use since the saw blade 2a can be moved from the folded position to the unfolded position with the use of only one hand. In addition, the foldable saw of the present invention is safe to use since, in view of the limited biasing force which is applied by the release spring 5 on the saw blade 2a, the pointed tip 201a of the saw blade 2a projects only by a small angle out of the slit 10a. The objective of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A foldable saw including
   an elongated handle member having opposite side walls and a top wall which bridges said side walls, said side walls confining a longitudinal slit therebetween,
   a saw blade formed as an elongated flat plate with a teethed edge, said saw blade having a tip and a rounded end portion which is opposite to said tip and which is mounted pivotally on said handle member such that said saw blade is pivotable between a folded position, wherein said saw blade is concealed within said slit of said handle member, and an unfolded position, wherein said saw blade is extended from said handle member, and a locking unit mounted on said handle member and operable so as to engage releasably said rounded end portion of said saw blade to lock said saw blade in a selected one of said folded and unfolded positions, wherein:

said saw blade has an indented section located between said rounded end portion and said teethed edge, said top wall of said handle member being formed with a through hole which extends to said slit and which is aligned with said indented section of said saw blade when said saw blade is in said folded position, said through hole having a release spring disposed therein, said through hole further having an internally threaded upper section which engages an externally threaded plug that abuts against one end of said release spring, said release spring being compressed by said saw blade when said saw blade is locked by said locking unit in said folded position, said release spring expanding to cause said tip of said saw blade to project out of said slit of said handle member when said locking unit is operated to unlock said saw blade from said folded position, said rounded end portion of said saw blade being sized so as to abut against said release spring when said saw blade is in said unfolded position.

2. The foldable saw as claimed in claim 1, wherein said handle member has an embossed outer surface to facilitate handling.

\* \* \* \* \*